United States Patent [19]

Radwill et al.

[11] 4,186,914
[45] Feb. 5, 1980

[54] DUAL RATE SPRING DEVICE FOR RAILROAD CAR TRUCKS

[75] Inventors: Robert P. Radwill, Oak Lawn; Charles Moehling, Arlington Heights, both of Ill.

[73] Assignee: AMSTED Industries Incorporated, Chicago, Ill.

[21] Appl. No.: 916,106

[22] Filed: Jun. 16, 1978

[51] Int. Cl.² ............................. B61F 5/06; F16F 3/04
[52] U.S. Cl. .......................................... 267/4; 267/168
[58] Field of Search ..................... 105/197 A, 197 R; 267/4, 168

[56] References Cited

U.S. PATENT DOCUMENTS

| 190,582 | 5/1877 | Hansell | 267/168 X |
| 1,095,641 | 5/1914 | Johnson | 267/168 X |
| 1,934,579 | 11/1933 | Wine | 267/4 |
| 2,386,895 | 10/1945 | Haseltine | 267/4 X |

FOREIGN PATENT DOCUMENTS 188020  3/1964  Sweden ..................................... 267/168

Primary Examiner—Duane A. Reger
Attorney, Agent, or Firm—John L. Schmitt; Fred P. Kostka; Edward J. Brosius

[57] ABSTRACT

A dual rate spring device particularly adapted for use in a suspension system of a railroad car truck includes a vertically mounted light duty spring means positioned, for example, between a side frame of the truck and a load carrying bolster of the truck to support the bolster when in a lightly loaded condition. Positioned around the light duty spring means is a shorter heavy duty spring which with the light duty spring supports the bolster when in a heavily loaded condition. To insure that the device functions properly under varying load conditions, a lower end of each spring is connected by a spring retainer.

4 Claims, 9 Drawing Figures

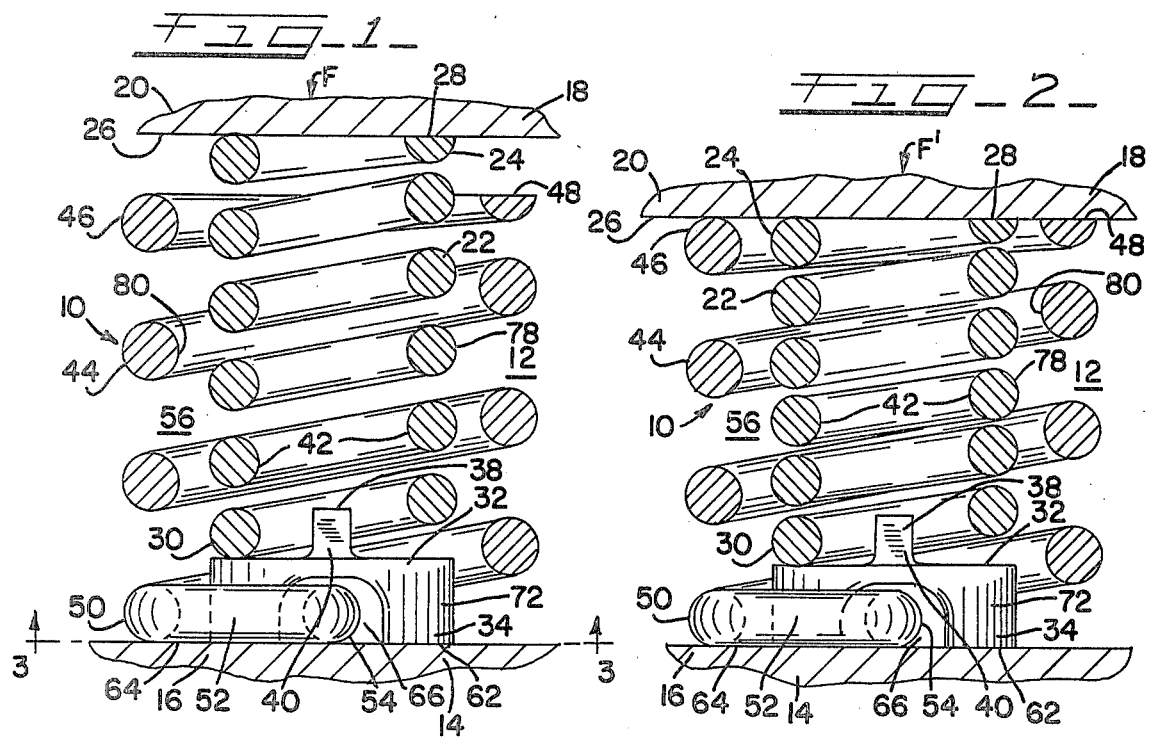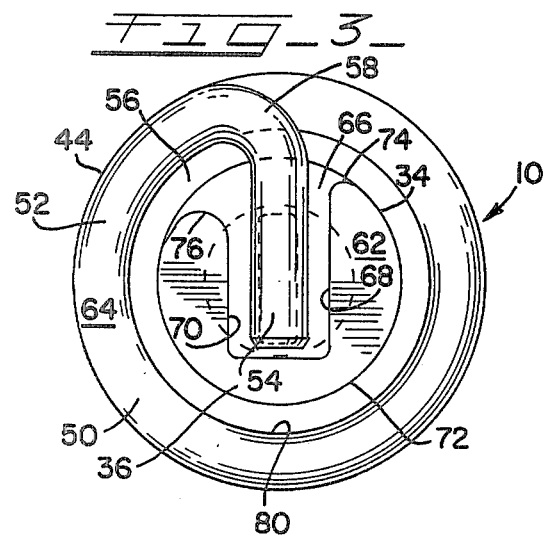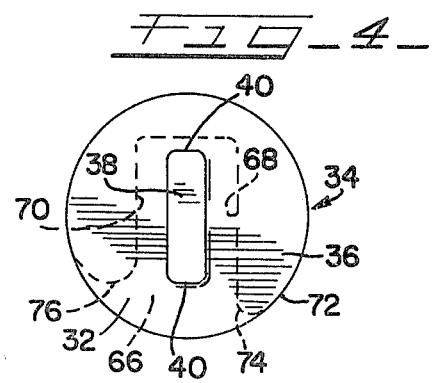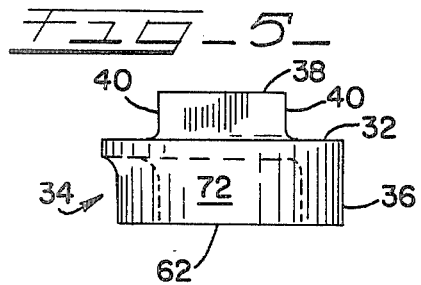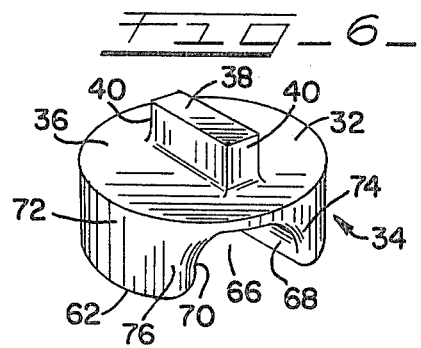

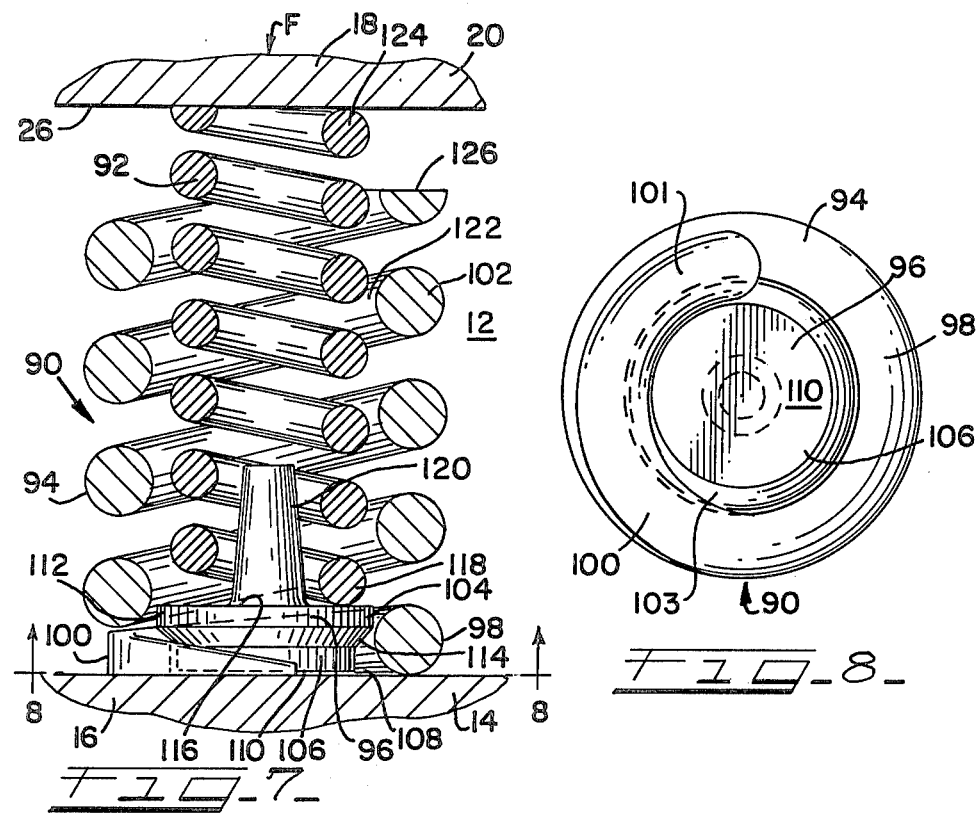
FIG_7_
FIG_8_
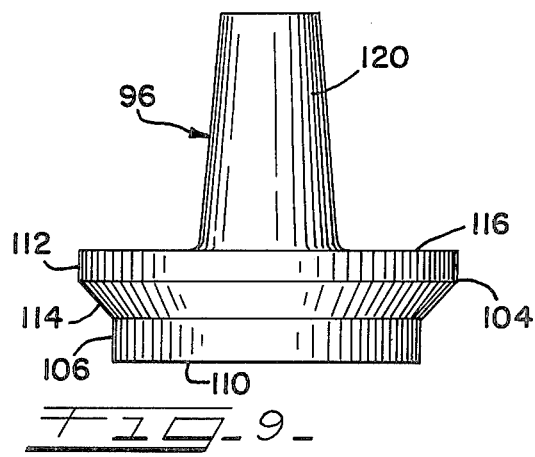
FIG_9_

DUAL RATE SPRING DEVICE FOR RAILROAD CAR TRUCKS

BACKGROUND OF THE INVENTION

1. Field of the Invention

This invention relates to dual rate spring devices for use in a railroad car truck operated under distinct loading conditions and particularly adapted for use in a railroad car truck where a body of the car is either in a fully loaded or empty condition.

2. Description of the Prior Art

The use of a longer light duty spring disposed within a shorter heavy duty spring to resiliently support a load carrying bolster of a railroad car truck is well known. The longer light duty spring has a sufficient load rate to support the bolster when the car body above is empty or lightly loaded.

When the car body is fully loaded, the light duty spring compresses a sufficient length that the bolster contacts the shorter heavy duty spring such that both springs support the bolster and car body above.

A major problem with presently known dual spring arrangements is that under those conditions in which the heavy duty spring remains unloaded, it is relatively unrestrained to cause excessive noise and produce wear of adjacent parts.

One solution to this problem is disclosed in co-pending application Ser. No. 858,622 wherein a lower end of the outer heavy duty spring is affixed to a retaining cup.

SUMMARY OF THE INVENTION

The dual rate spring device of this invention includes a shorter heavy duty spring having a bottom end convolution formed so as to project into an inner space of the spring. Within this inner space of the heavy duty spring and in contact with the convolution is a spring retaining element. A longer light duty spring in turn is also positioned within the inner space of the heavy duty spring and contacts the spring retainer element.

The heavy duty spring is supported by a side frame of the car truck while an upper end of the light duty spring engages with a bolster of the truck. During light loading operation of the truck, a load on the bolster is transferred from the light duty spring to the spring retainer element so as to maintain the relative position of the heavy duty spring with respect to the car truck side frame. During heavy duty operation of the truck, the load on the bolster is carried by both springs which in turn are supported by the car truck side frame.

An important advantage of the dual rate spring device of this invention is that the device may be readily assembled or disassembled since all elements are loosely joined. Thus, any element may be easily replaced if such becomes worn or damaged.

An added benefit of this feature of ready assemblability is that the resilient characteristics of the device may be quickly modified by using springs of different load rates.

A further important advantage of this dual rate spring device is that the relative position of the heavy duty spring under light loading operation is maintained by its engagement with the spring retainer element, and thus there is no excessive noise or wear during light loading operation.

DESCRIPTION OF THE DRAWINGS

FIG. 1 is a side cross-sectional elevational view of a dual rate spring device of this invention under a light load condition.

FIG. 2 is a side elevational view of the dual rate spring device of FIG. 1 under a heavy load condition.

FIG. 3 is a bottom view of the dual rate spring device as seen generally along the line 3—3 of FIG. 1.

FIG. 4 is a top plan view of a spring retainer element of the dual rate spring device of FIG. 1.

FIG. 5 is a side elevational view of the spring retainer element of FIG. 4.

FIG. 6 is a perspective view of the spring retainer element of FIG. 4.

FIG. 7 is a side cross-sectional elevational view of another embodiment of the dual rate spring device of this invention.

FIG. 8 is a bottom view of the dual rate spring device of FIG. 7 as seen generally along the line 8—8 of FIG. 7.

FIG. 9 is a detailed elevational view of another spring retainer element as used in the device of FIG. 7.

DESCRIPTION OF THE PREFERRED EMBODIMENT

A dual rate spring device of this invention is shown generally in FIGS. 1 and 2 and designated 10.

The device 10 may be positioned within a side frame pocket 12 formed in part by a bottom tension member of a conventional side frame 16 (shown in part) of a railroad car truck (shown in part). FIG. 1 depicts the device 10 in a lightly loaded condition while FIG. 2 depicts the device 10 in a heavily loaded position.

As seen in FIG. 1, an end 18 of a bolster 20 of the car truck, which is positioned transversely to the side frame 16, has a bottom surface 26 engaging an upper end 24 of a light duty spring 22 of the device 10.

The upper end 24 of the light duty spring 22 has a ground top surface 28 so that contact between the top surface 28 of the light duty spring 22 and the bottom surface 26 of the bolster end 18 proximates 240 degrees. Thus, an effective area of contact between the upper end 24 of the light duty spring 22 and the bottom surface 26 of the bolster end 18 is maximized.

A lower end 30 of the light duty spring 22 rests on a support surface 32 of a spring retainer element 34 having a circular shaped body 36 of a diameter proximating but slightly greater than an outer diameter of the light duty spring 22. Under full compression of the light duty spring 22, the top surface 32 remains supportive of such.

Projecting upwardly from the top support surface 32 of the spring retainer element 34 is a rib 38 having spaced end walls 40 of sufficient height and distance therebetween to form a loose fit with an inner surface 42 of the light duty spring 22, so as not to interfere with relative vertical movements of the light duty spring 22.

Positioned about the light duty spring 22 and the spring retainer element 34 is a heavy duty spring 44 having an upper end 46 which has a ground top surface 48 similar to the top surface 28 of the light duty spring 22. A lower end 50 of the heavy duty spring 44 includes a bottom coil convolution 52 having an inwardly positioned pigtail coil portion 54 formed at the end of such. the pigtail portion 54 projects into an inner receiving space 56 of the heavy duty spring 44 a distance proximating ⅔ of a diameter of the inner space 56 to proximately intersect a longitudinal axis of the heavy duty spring 44. The pigtail coil portion 54 and the bottom coil convolution 52 join to form a radius corner 58 having a diameter in the range of ⅜ to ½ inch.

A flat bottom surface 62 of the spring retainer 34 and a bottom surface 64 of the bottom coil convolution 52 and the pigtail portion 54 of the heavy duty spring 44 rest on the tension member 14 of the side frame pocket 12. The bottom surface 62 of the spring retainer 34 is formed with a laterally positioned slot 66 defined by spaced vertical sidewall 68, 70. The longitudinal axis of the slot 66 proximately intersects a center point of the spring retainer body 36. The sidewall 68 terminates immediately adjacent an outer sidewall 72 of the spring retainer body 36 and is joined to such by a sharp radius corner 74. On the other hand, the sidewall 70 of the slot 66 terminates inwardly from the outer sidewall 72 and is joined to such by a substantial radius corner 76.

Received within the slot 66 is the pigtail coil portion 54 of the heavy duty spring 44 with the radius corner 76 of the spring retainer slot 66 positioned adjacent to the radius corner 58 of the heavy duty spring 44. The sidewalls 68, 70 are so spaced that a selective amount of relative angular movement between the spring retainer 34 and the heavy duty spring 44 is allowed. Under nomral conditions, an outer surface 78 of the light duty spring 22 and an inner surface 80 of the heavy duty spring 44 are not in contact.

The device 10 may be readily assembled by placing the spring retainer element 34 within the inner space 56 of the heavy duty spring 44 and allowing the spring retainer element 34 to drop to the lower end 50 of the heavy duty spring 44. The spring retainer 34 is so oriented that the slot 66 fits over the pigtail portion 54 of the heavy duty spring 44. The rib 38 of the spring retainer element 34 provides a convenient contact area to allow manual manipulation of the retainer element 34 for insertion and orientation within the inner space 56 of the heavy duty spring 44.

As seen in FIG. 1 wherein the device 10 is in a lightly loaded condition, a force F as depicted by an arrow F is applied to the device 10 by contact between the bolster end 18 and the upper end 24 of the light duty spring. The magnitude of the force F is determined by the weight of a substantially empty body (not shown) of a railroad car (not shown) supported by the bolster 20. The force F compresses the light duty spring 22 a limited distance but not sufficiently that the bolster end 18 comes in contact with the upper end 46 of the heavy duty spring 44.

The position of the deivce 10 between the bolster end 18 and the tension member 14 of the side frame 16 is maintained by frictional engagement therebetween. This friction is a result of the force F and contact between the bottom surface 28 of the bolster 20 and the top surface 28 of the light duty spring 22 and between the bottom surface 62 of the spring retainer element 34 and the side frame tension member 14. The position of the heavy duty spring 44 is maintained by engagement between the pigtail portion 54 of the bottom coil convolution 54 of the heavy duty spring 44 and the sidewalls 68, 70 of the slot 66 in the spring retainer element 34.

As seen in FIG. 2 where the device 10 is in a heavily loaded condition, a force F' is of a sufficient magnitude that the light duty spring 22 is compressed to a length such that the bolster end 18 comes into contact with the top surface 48 of the heavy duty spring 44. The bolster 20 and car body above are thereby supported by both the light and heavy duty springs 22, 44. Lateral movement of the heavy duty spring 44 is further impeded by the frictional engagement between the bottom surface 26 of the bolster end 20 and the top surface 48 of the heavy duty spring 44 and between the bottom surface 64 of the heavy duty spring 44 and the side frame tension member 14.

Another embodiment of a dual rate spring device of this invention is seen in FIGS. 7, 8 and 9 and designated 90. The dual rate spring device 90 includes a light duty spring 92, a shorter heavy duty spring 94 and a spring retainer element 96.

A bottom end 98 of the heavy duty spring 94 is formed with a bottom coil convolution portion 100 having a semi-circular end part 101 formed on a lesser diameter than the remaining coil convolutions 102 so as to project into an inner space 122 of the heavy duty spring 94 and form a receiving space 103. The bottom coil convolution 100 is prepared to be supported by the bottom tension member 14 of the side frame pocket 12 as was described earlier. The bottom coil convolution 100 also serves as a support for a base portion 104 of the spring retainer element 96.

The base portion 104 of the spring retainer element 96 is defined by a lower circular part 106 having a diameter less than the inside diameter of the bottom coil convolution 100 of the heavy duty spring 94 so as to provide a loose fit therebetween. Additionally, a height of the lower circular part 106 is slightly less than a cross-sectional thickness of the bottom coil convolution 100 to form a space 108 between a bottom surface 110 of the spring retainer element 96 and the tension member 14.

The base portion 104 of the spring retainer element 96 is further defined by an upper circular part 112 having a diameter greater than the inside diameter of the heavy duty spring bottom coil convolution 100 but less than the inside diameter of the remaining coil convolutions 102 so as to provide a loose fit therebetween. The lower and upper parts 106, 112 are joined by a middle part 114 formed on an inclined angle proximating 45 degrees. The middle part 114 of the spring retainer element base portion 104 engages the bottom coil convolution 100 of the heavy duty spring 94 and is supported thereby.

A flat top surface 116 of the base portion 104 engages with a bottom end 118 of the light duty spring 92 to support the light duty spring 92 thereon. Extending upwardly from the top surface 118 is a conical spaced projection 120 which may serve as a convenient handle for manual manipulation of the spring retainer element 94 for insertion within the inner space 122 of the heavy duty spring.

The device 90 may be easily assembled by merely placing the spring retainer element 96 within the inner space 122 of the heavy duty spring 94 and allowing the spring retainer element 96 to drop and seat on the bottom convolution 100 of the heavy duty spring 94. The projection 120 of the spring retainer element 96 allows proper seating to be easily accomplished. The light duty spring 92 then may be placed within the inner space 122 of the heavy duty spring 94 with the bottom end 118 of the light duty spring 92 resting on the top surface 116 of the spring retainer base portion 104.

Like the device 10, under a light loading condition, an upper end 124 of the light duty spring 92 extends above an upper end 126 of the heavy duty spring 94 and engages the bottom surface 26 of the bolster end 18 to resiliently support such. It should be understood that under a heavy loading condition, the light duty spring 92 is sufficiently compressed that the bottom surface 26 of the bolster end 18 also engages the upper end 124 of the heavy duty spring 94 and is supported on both springs 92, 94.

During travel of the railroad car in a lightly loaded condition, the lateral position of the device 90 is maintained by the frictional engagement between the bottom surface 26 of the bolster end 18 and the upper end 124 of the light duty spring 92 and between the bottom coil convolution 100 of the heavy duty spring 94 and the tension member 14 of the side frame pocket 12. This frictional engagement is a result of the force F as applied to the bolster 20 by the car body above. This force F is transferred from the light duty spring 92 to the spring retainer 96 and in turn to the heavy duty spring 94. Movement, either vertically or laterally, of the heavy duty spring 94 is thus restricted.

During travel of the railroad car in a heavily loaded condition, the lateral position of the device 90 is further restricted by the frictional engagement between the bottom surface 26 of the bolster end 18 and the upper end 126 of the heavy duty spring 94 and by the increased magnitude of the frictional forces resulting from the force F increasing in value to F'.

While various modifications may be suggested by those versed in the art, it should be understood that we wish to embody within the scope of the patent warranted hereon, all such modifications as reasonably and properly come within the scope of our contribution to the art.

What is claimed is:

1. A dual rate spring device particularly adapted for use between a bolster and a side frame of a railroad car truck where said truck is used with a railroad car body operated in a lightly loaded condition or in a heavily loaded condition, said device comprising,
    a heavy duty spring having one end formed with a convolution projecting inwardly to define an inner receiving space,
    a spring retainer element loosely disposed within said inner receiving space of said heavy duty spring end convolution and in contact with said end convolution to inhibit movement of said spring when said device is in a lightly loaded condition, and
    a light duty spring having one end disposed within said heavy duty spring to contact said spring retainer and an opposite end extending outwardly from an opposite end of said heavy duty spring,
    wherein said device may be conveniently supported on a horizontal tension member forming in part a pocket in said side frame with said heavy duty spring in contact with said member and only said opposite end of said light duty spring in contact with said bolster to support such in a resilient manner when said car truck is lightly loaded with said heavy duty spring restrained from movement by said retainer.

2. A dual rate spring device as defined by claim 1 and further characterized by,
    said convolution of said heavy duty spring having a pigtail portion projecting into receiving said inner space to proximately intersect a longitudinal axis of said heavy duty spring, and
    said spring retainer element having a lateral slot formed therein to receive said pigtail portion.

3. A dual rate spring device as defined by claim 1 and further characterized by,
    said end convolution of said heavy duty spring including a semi-circular end part formed having a diameter of a lesser dimension than other convolutions forming said spring, and
    said spring retainer element having a base portion defined by a lower circular part fitting loosely within said receiving space formed in part by said end convolution semi-circular end part and an upper circular part having a size greater than said receiving space but lesser than said other convolutions, said upper and lower parts of said spring retainer element base portion joined by an inclined middle part in contact with said end convolution and said semi-circular end part.

4. In a dual rate spring device particularly adapted for operatively connecting a bolster and a side frame of a railroad car truck where said truck is used with a railroad car body operated primarily in a lightly loaded condition or in a heavily loaded condition, the improvement therein comprising,
    a heavy duty spring having one end formed with a convolution projecting into an inner space of said spring, said convolution including a pigtail portion proximately intersecting a longitudinal axis of said spring,
    a spring retainer element having a lateral slot, said retainer disposed within said inner space of said heavy duty spring and in contact with said convolution with said pigtail portion received in said slot, and
    a light duty spring having one end disposed within said inner space of said heavy duty spring to engage with said spring retainer and an opposite end projecting outwardly from an opposite end of said heavy duty spring,
    wherein said device may be conveniently supported on a horizontal tension member forming in part a pocket in said side frame with said heavy duty spring in contact with said tension member and said opposite end of said light duty spring in contact with said bolster to support such in a resilient manner.

* * * * *